(12) United States Patent
Hayashi

(10) Patent No.: US 6,360,242 B1
(45) Date of Patent: Mar. 19, 2002

(54) SUMMING CIRCUIT WITH HIGH PRECISION

(75) Inventor: Naoki Hayashi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/323,941

(22) Filed: Jun. 2, 1999

(30) Foreign Application Priority Data

Jun. 4, 1998 (JP) .......................................... 10-156173

(51) Int. Cl.⁷ ................................................. G06F 7/50
(52) U.S. Cl. ...................................................... 708/709
(58) Field of Search ............................ 708/709, 706, 708/700

(56) References Cited

U.S. PATENT DOCUMENTS 5,375,079 A * 12/1994 Uramoto et al. ............ 708/709
5,490,100 A *  2/1996 Kableshkov ................ 708/709
5,777,918 A *  7/1998 Chan et al. .................. 708/709

FOREIGN PATENT DOCUMENTS

JP          9-62653        3/1997

OTHER PUBLICATIONS

R. H. Larson, "Medium Speed Multiply", *IBM Technical Disclosure Bulletin*, vol. 16, No. 7, Dec. 1973, p. 2055.

Tien Chi Chen, "Efficient Arithmetic Apparatus and Method", *IBM Technical Disclosure Bulletin*, vol. 14, No. 1, Jun. 1971, pp. 328–330.

* cited by examiner

*Primary Examiner*—David H. Malzahn
(74) *Attorney, Agent, or Firm*—Sughrue Mion, PLLC

(57) ABSTRACT

A summing circuit includes a summing section and a shift bit searching section. The summing section receives an input data and a previous summation resultant data, bit-shifts the input data and the previous summation resultant data in response to first and second bit shift control signals, respectively. Also, the summing section adds the bit-shifted input data and the bit-shifted previous summation resultant data to generate a current summation resultant data and to output a part of the current summation resultant data as a shift bit calculation data. The shift bit searching section outputs the first and second bit shift control signals for addition of a next input data and the current summation resultant data to the summing section based on the shift bit calculation data.

11 Claims, 8 Drawing Sheets

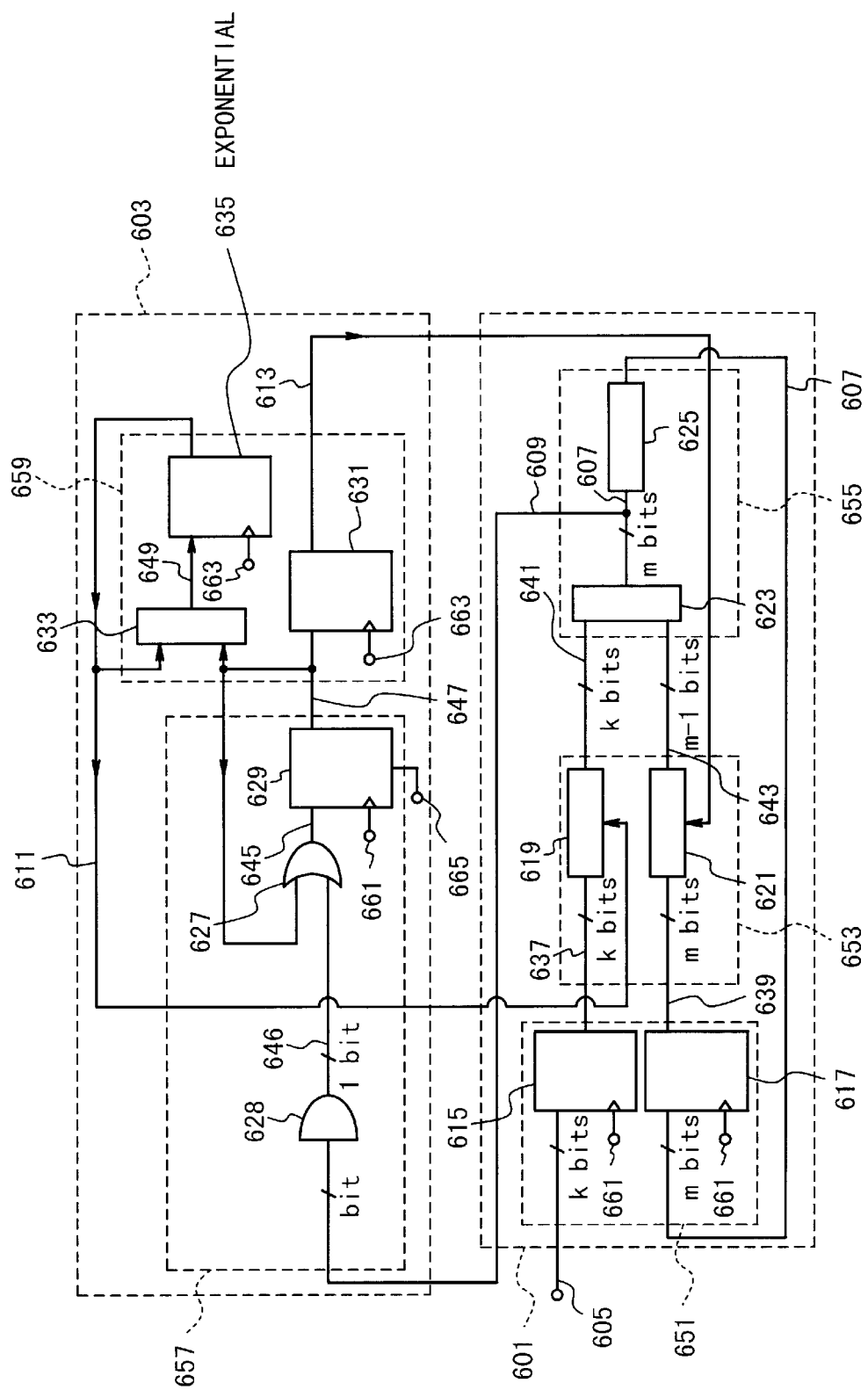

SUMMING CIRCUIT WITH HIGH PRECISION

BACKGROUND OF THE INVENTION

1. Field of the Invention

The present invention relates to a summing circuit used in a digital system.

2. Description of the Related Art

In a digital signal processing system, an input digital signal is generally subjected to a filtering process using a convolution integration. The convolution integration is carried out through summation. Therefore, it is desired to execute a great deal of calculation in a higher speed and a higher precision. The summing circuit contributes to improvement in the processing speed and the calculation precision in the above-mentioned product and summation calculation, in addition to addition of a plurality of digital data.

FIG. 1 shows a typical summing circuit as a first conventional example. The first conventional example of the summing circuit is composed of a shifter 701, an adder 703 and a RAM 705. The shifter 701 shifts a k-bit input data into the LSB direction of the input data to output as a (m−n)-bit data. The adder 703 adds the (m−n) data and a previous summation data to output a new current m-bit summation data. The RAM 705 stores the summation data temporarily.

Referring to FIG. 1, a plurality of k-bit positive data are summed. While the summing result is stored in the RAM 705, the summation is carried out p times and an m-bit summation value is obtained. In this case, for the purpose of avoiding the cutting-off of a part of data without any overflow, it is necessary to satisfy the relation of m=k+n in (n−1)<log(p)≦n (the base of the logarithm is 2). In this case, the value m increases as the value n increases. As a result, the capacity of the RAM 705 necessary to store the summation also increases.

Next, FIG. 2 shows a summing circuit of the product and summation unit in Japanese Laid Open Patent Application (JP-A-Heisei 9-62653) as a second conventional example. Referring to FIG. 2, the second conventional example of the summing circuit is composed of a first adder 801, a second adder 803, a third adder 805, a register 809 and a multiplexer 807. The first adder 801 is provided for a calculation to a lower 8 bits of an output of the summing circuit. The second adder 803 is provided for a calculation to a middle 8 bits of the output of the summing circuit. The third adder 805 is provided for a calculation to an upper 8 bits of the output of the summing circuit. The register 809 stores the summing result temporarily. The multiplexer 807 outputs the calculating result of the summing circuit based on a signal supplied to a third input terminal 814.

The operation of the above summing circuit will be described. Referring to FIG. 2, a 8-bit data is supplied to a second input terminal 813 and is converted into a digit shift data 816 indicative of a digit shift quantity by a data converter 818. A barrel shifter 811 shifts a data signal from a first input terminal 812 in digit based on the digit shift data 816 to output a 16-bit data. Thus, a multiplying process is executed. Subsequently, the lower 8-bit data of the 16-bit data from the barrel shifter 811 is supplied to the first adder 801, and the upper 8-bit data is supplied to the second adder 803. Thus, the summing process is started.

The first adder 801 adds the lower 8-bit data from the barrel shifter 811 and a lower 8-bit data of a 24-bit data from the multiplexer 807 to output an addition result data to the register 809 as the lower 8-bit data of the summing circuit. Also, the first adder 801 outputs a lower carry signal to the register 809. In this case, the first adder 801 outputs the lower carry signal having the bit state of "1" to the register 809, when the overflow occurs in the data of the addition result.

The second adder 803 adds the upper 8-bit data of the 16-bit data from the barrel shifter 811 and a middle 8-bit data of the 24-bit data from the multiplexer 807 to output a summation resultant data to the register 809 as the middle 8-bit data of the summing circuit. In this case, the second adder 803 adds "1" to the least significant bit of the summation resultant data, when the lower carry signal is "1". Also, the second adder 803 outputs the summation resultant data to the register 809 when the carry signal is "0". Also, the second adder 803 outputs a middle carry signal to the register 809. Further, the second adder 803 outputs a middle carry signal of "1" when the overflow occurs in the summation resultant data.

The third adder 805 adds "1" to the least significant bit of an upper 8-bit data of the 24-bit data from the multiplexer 807 when the middle carry signal is "1", and outputs the summation resultant data to the register 809. When the middle carry signal is "0", the third adder 805 outputs the summation resultant data from the multiplexer 807 to the register 809 just as it is. One of the input terminals of the third adder 805 is grounded such that data of "0" is always inputted to the input terminal.

The register 809 holds the summation resultant data from the first adder 801, the lower carry signal, the summation resultant data from the second adder 803, the middle carry signal, and the summation resultant data from the third adder 805 by one period of a clock signal to output to the multiplexer 807.

The multiplexer 807 selectively outputs one of the data supplied through the third input terminal 814 and the data supplied from the register 809. That is, the multiplexer 807 outputs the input data of "0" supplied through the third input terminal 814 to another input terminal of the first adder 801, the carry input terminal of the second adder 803, another input terminal of the second adder 803, the carry input terminal of the third adder 805 and another input terminal of third adder 805 in response to the first clock signal. Also, the multiplexer 807 outputs the data supplied from the register 809 to the first, second and third adders in response to the second clock signal and the subsequent, as follows. That is, the multiplexer 807 outputs the summation resultant data supplied from the first adder 801 to the other input terminal of the first adder 801, the lower carry signal supplied from the first adder 801 to the carry input terminal of the second adder 803, the summation resultant data supplied from the second adder 803 to the other input terminal of the second adder 803, the middle carry signal supplied from the second adder 803 to the carry input terminal of the third adder 805, and the summation resultant data supplied from the third adder 805 to the other input terminal of the third adder 805.

The above summing circuit is a 24-bit adder composed of three 8-bit adders and one register. The lower carry signal from the first adder 801 and the middle carry signal from the second adder 803 are transmitted to the adders on the side of the upper bits at the time of the next clock, after being held in the register for one period time of the clock signal. In this way, the carry transmission time for the addition is made short so that it is possible to short the summing operation time.

In the first conventional example shown in FIG. 1, the relation of m<k+n is attained when the capacity of the RAM, i.e., the data word length is constrained. In order to prevent an overflow, it is necessary to cut off a part of data before the adding operation. The lower bits of each input data are cut off in advance to produce (m−n)-bit data for the adding operation. In this method, when (k+n−m) becomes large, the summation precision is degraded largely.

On the other hand, in the second conventional example shown in FIG. 2, the data converter and the barrel shifter are used in the product and summation unit, to prevent an overflow in the summing circuit. However, this function is contained in the function for the multiplying process, and the summing circuit does not have the function as its internal function.

SUMMARY OF THE INVENTION

An object of the present invention is to provide a summing circuit in which degradation of the summation precision can be reduced without increasing a RAM capacity necessary to hold a summation resultant data.

In order to achieve an aspect of the present invention, a summing circuit includes a summing section and a shift bit searching section. The summing section receives an input data and a previous summation resultant data, bit-shifts the input data and the previous summation resultant data in response to first and second bit shift control signals, respectively. Also, the summing section adds the bit-shifted input data and the bit-shifted previous summation resultant data to generate a current summation resultant data and to output a part of the current summation resultant data as a shift bit calculation data. The shift bit searching section outputs the first and second bit shift control signals for addition of a next input data and the current summation resultant data to the summing section based on the shift bit calculation data.

The summing section includes a data holding section, a data shifter and a data adder. The data holding section holds the input data and the previous summation resultant data to output as first and second output data, respective. The data shifter shifts the first output data into a LSB (Least Significant Bit) direction in response to the first bit shift control signal to output a first shift data. Also, the data shifter shifts the second output data into the LSB direction in response to the second bit shift control signal to output a second shift data. The data adder adds the first and second shift data to output the current summation resultant data and the shift bit calculation data.

In this case, the data adder may include a first adder which adds the first and second shift data to output the current summation resultant data, and a memory unit which stores the current summation resultant data.

Also, the-data adder may includes a first adder which adds the first and second shift data to output the current summation resultant data.

The data holding section may include a first latch circuit which holds the input data to output the first output data, and a second latch circuit which holds the previous summation resultant data to output the second output data.

The data shifter may include a first shifter which bit-shifts the first output data based on the first bit shift control signal to output the first shift data, and a second shifter which bit-shifts the second output data based on the second bit shift control signal to output the second shift data.

The shift bit searching section may include a data searching section and a control data generating section. The data searching section outputs a third output data in response to a change of the shift bit calculation data. The control data generating section generates the first and second bit shift control signals based on the third output data.

In this case, the data searching section preferably includes a logical OR calculating circuit, and a flip-flop circuit which holds a logical OR output data outputted from the logical OR calculating circuit to output a third output data. At this time, the logical OR calculating circuit receives the shift bit calculation data and the third output data to output the logical OR output data. Instead, the data searching section may include a logical AND calculating circuit which calculates a logical AND of bits of the shift bit calculation data, a logical OR calculating circuit and a third latch circuit which holds a logical OR output data outputted from the logical OR calculating circuit to output a third output data. At this time, the logical OR calculating circuit receives the shift bit calculation data and the third output data to output the logical OR output data.

The control data generating section may include a fourth latch circuit, a second adder and a fifth latch circuit. The fourth latch circuit outputs the second bit shift control signal based on the third output data. The second adder adds the third output data and the first bit shift control signal to output a shift bit data. The fifth flip-flop generates the first bit shift control signal based on the shift bit data outputted from the second adder, the first bit shift control signal being outputted to the second adders In order to achieve another aspect of the present invention, a method of summing a plurality of input data, includes:

bit-shifting an input data and a previous summation resultant data in response to first and second bit shift control signals, respectively;

adds the bit-shifted input data and the bit-shifted previous summation resultant data to generate a current summation resultant data, a part of the current summation resultant data being a shift bit calculation data; and estimating the first and second bit shift control signals for addition of a next input data and the current summation resultant data based on the shift bit calculation data.

BRIEF DESCRIPTION OF THE DRAWINGS

FIG. 8 is a block diagram illustrating the structure of the summing circuit according to a third embodiment of the present invention.

DESCRIPTION OF THE PREFERRED EMBODIMENTS

Next, a summing circuit of the present invention will be described below in detail with reference to the attached drawings.

Figure 1:
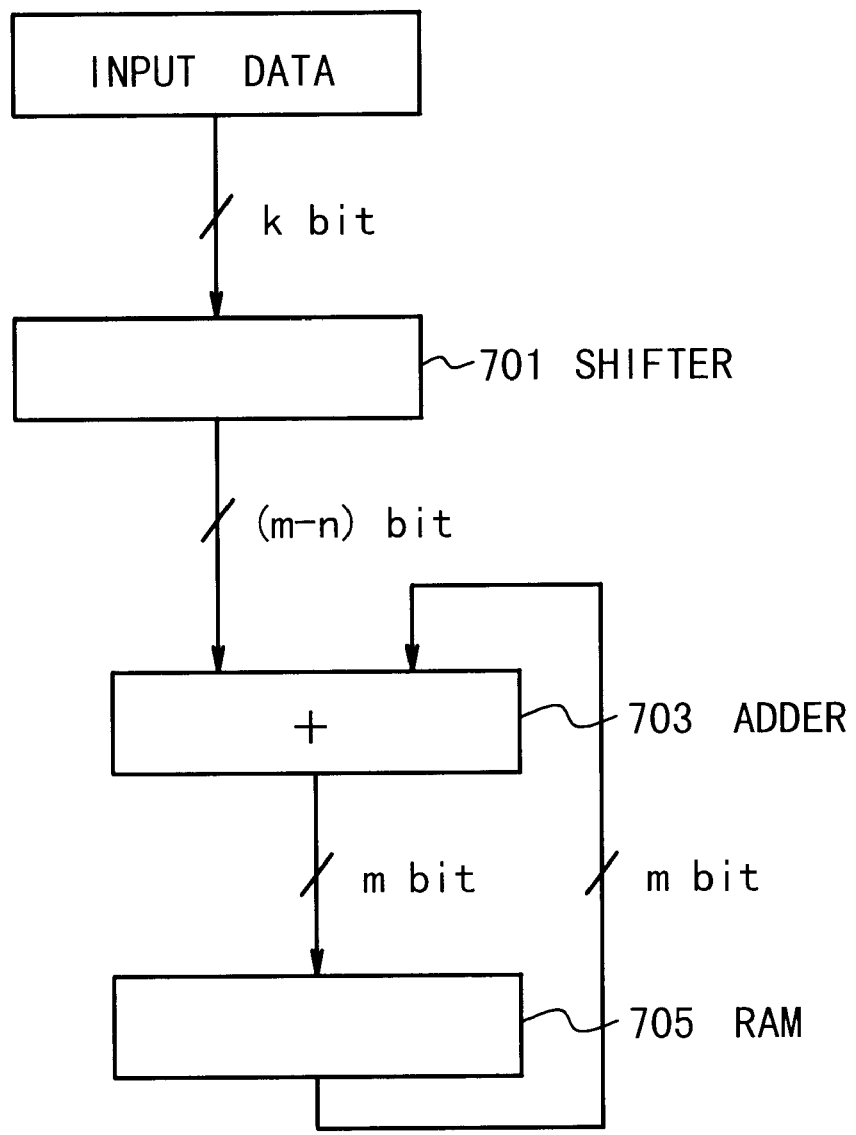
FIG. 1 is a block diagram illustrating the structure of a first conventional example of a summing circuit.
Figure 2:
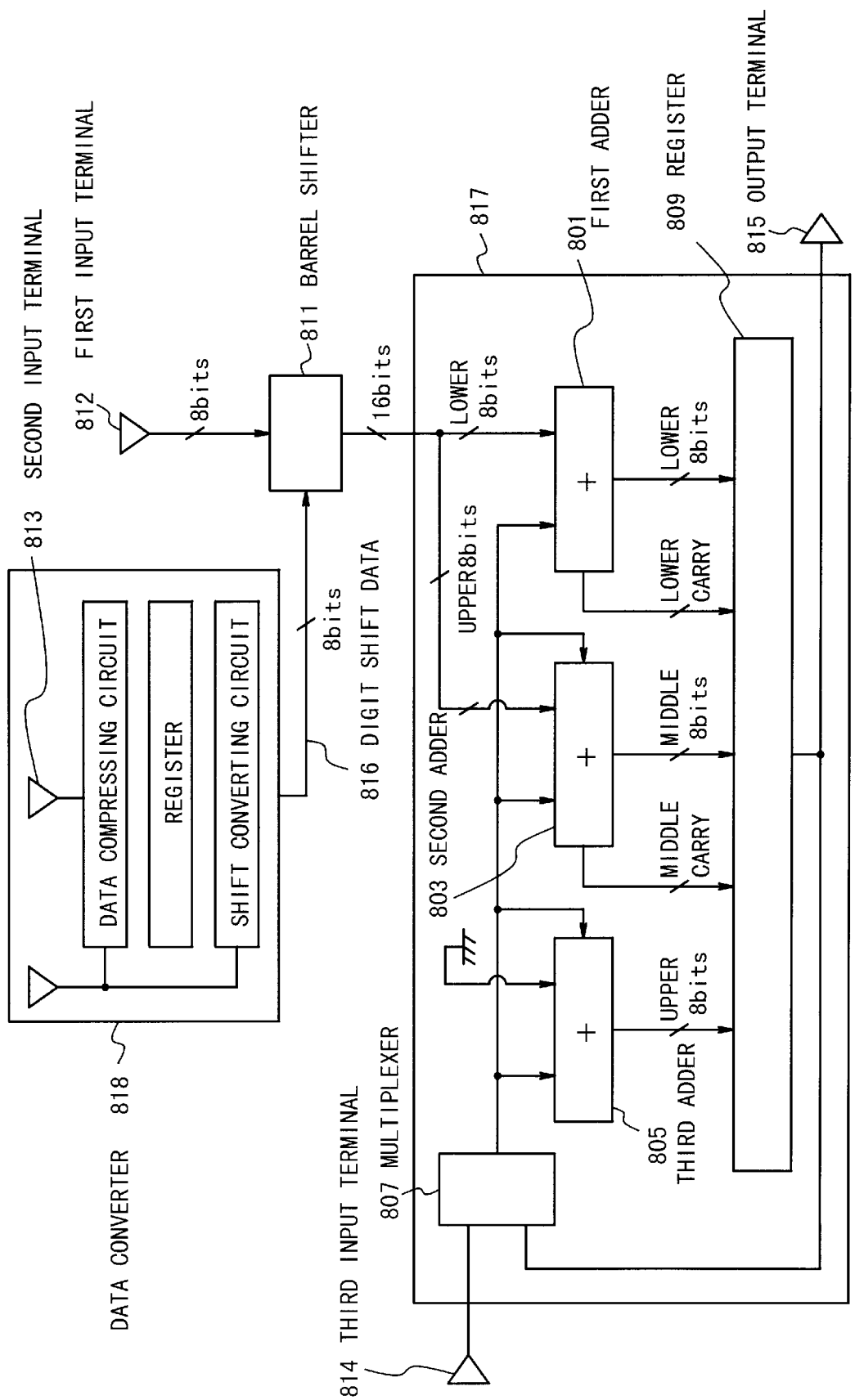
FIG. 2 is a block diagram illustrating the structure of a second conventional example of the summing circuit.
Figure 3:
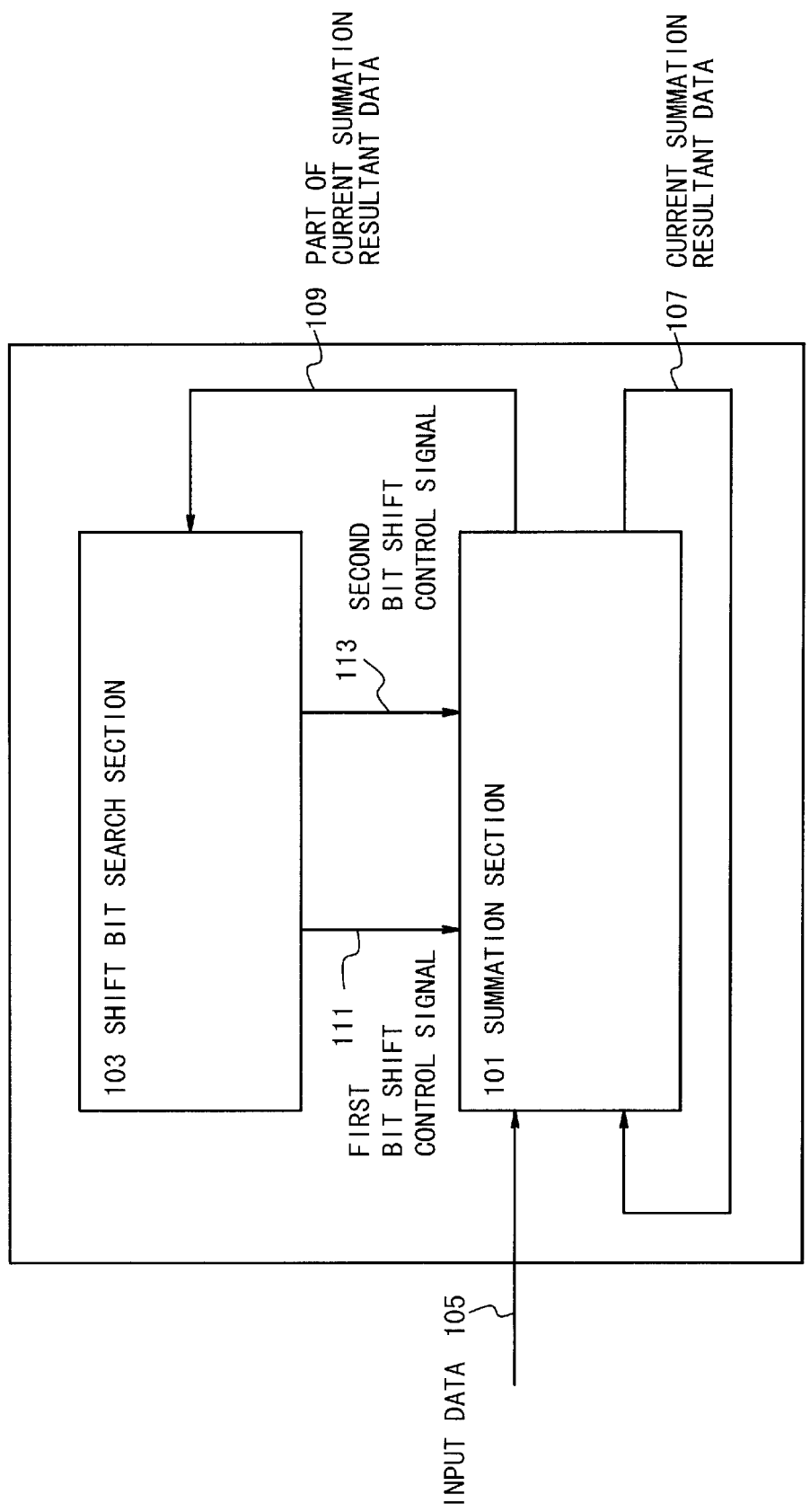
FIG. 3 is a block diagram illustrating the structure of a summing circuit of the present invention.

FIG. 3 is a block diagram illustrating the structure of the summing circuit of the present invention. It should be noted that this conceptual block diagram shown in FIG. 3 includes the structures of the first, second and third embodiments of the present invention to be mentioned later.

Referring to FIG. 3, the summing circuit is composed of a summation section 101 and a shift bit search section 103. The summation section 101 receives input data 105 and a previous summation resultant data 107. Then, the summation section 101 shifts said input data 105 in bit in response to a first bit shift control signal 111, and shifts the previous summation resultant data 107 in bit in response to the second bit shift control signal 113. The summation section 101 generates the current summation resultant data (not illustrated) from the bit-shifted input data 105 and the bit-shifted previous summation resultant data 107 to output a part of the current summation resultant data (not illustrated).

The bit shift search section 103 receives the partial data 109 of the current summation resultant data to estimate the bit shift amounts. Then, the bit shift search section 103 generates the first bit shift control signal 111 and the second bit shift control signal 113 for next summing calculation based on the bit shift amounts estimated from the partial data 109 of the current summation resultant data. That is, the shift bit search section 103 refers to the change or transaction of the current summation resultant data 107 using the partial data 109 of the current summation resultant data to generate the first bit shift control signal 111 and the second bit shift control signal 113 for the next summing calculation.

Also, the summation section 101 shifts in bit the input data 105 and the previous summation resultant data 107 into the direction of LSB (Least Significant Bit) in response to the first bit shift control signal 111 and the second bit shift control signal 113 to avoid an overflow.

Next, the summing circuit according to the first embodiment of the present invention will be described.

Figure 4:
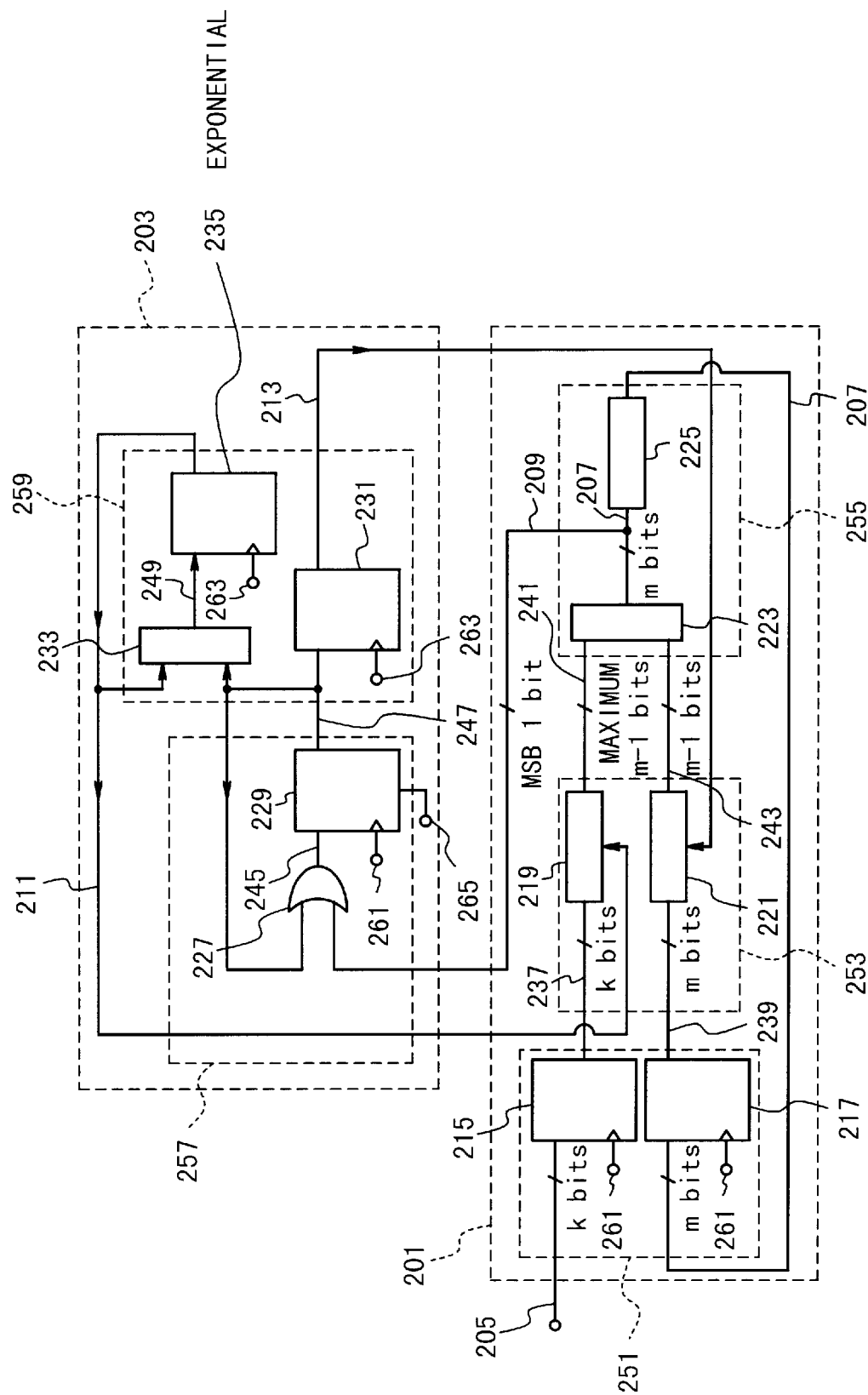
FIG. 4 is a block diagram illustrating the structure of the summing circuit according to a first embodiment of the present invention.

FIG. 4 shows the structure of the summing circuit according to the first embodiment of the present invention. Referring to FIG. 4, the summing circuit is composed of a summation section 201 and a shift bit search section 203. The summation section 201 is composed of a data holding section 251, a data shift section 253 and a data addition section 255. The shift bit search section 203 is composed of a data search section 257 and a control data generating section 259.

In the summation section 201, a data holding section 251 is composed of a first flip-flop circuit 215 and a second flip-flop circuit 217. The first flip-flop circuit 215 receives a k-bit input data 205 to output a first k-bit output data 237. The second flip-flop circuit 217 receives the m-bit previous summation resultant data 207 to output a second m-bit output data 239.

The data shift section 253 is composed of a first shifter 219 and a second shifter 221. The first shifter 219 receives the first output data 237 and bit-shifts the first output data 237 into the LSB direction in response to the first bit shift control signal 211 to output a first shift output data ((m−1) bits at maximum) 241. The second shifter 221 receives the second output data 239 to output the second shift output data ((m−1) bits at maximum) 243 in response to the second bit shift control signal 213.

The data adding section 255 is composed of a first adder 223 and a RAM 225. The first adder 223 adds the first shift output data 241 and the second shift output data 243 to output an m-bit current summation resultant data 207. The RAM 225 has an m-bit data word length and stores the current summation resultant data 207 temporarily as the previous summation resultant data for the next summing calculation.

Also, in the shift bit search section 203, a data search section 257 is composed of a logical OR calculating circuit 227 and a third flip-flop circuit 229. The third flip-flop receives and holds a logical OR output data 245 as an output of the logical OR calculating circuit 227 to output a third output data 247. Also, the logical OR calculating circuit 227 inputs the MSB (Most Significant Bit) data 209 of the current summation resultant data 207 and the third output data 247 to execute a logical OR calculation.

A control data generating section 259 is composed of a fourth flip-flop circuit 231, a second adder 233 and a fifth flip-flop circuit 235. The fourth flip-flop circuit 231 receives the third output data 247 to output the second bit shift control signal 213. The fifth flip-flop circuit 235 receives a shift bit data 249 as an output of the second adder 233 to output the first bit shift control signal 211. The second adder 233 inputs the third output data 247 and the first bit shift control signal 211 to execute an adding calculation.

Figure 5:
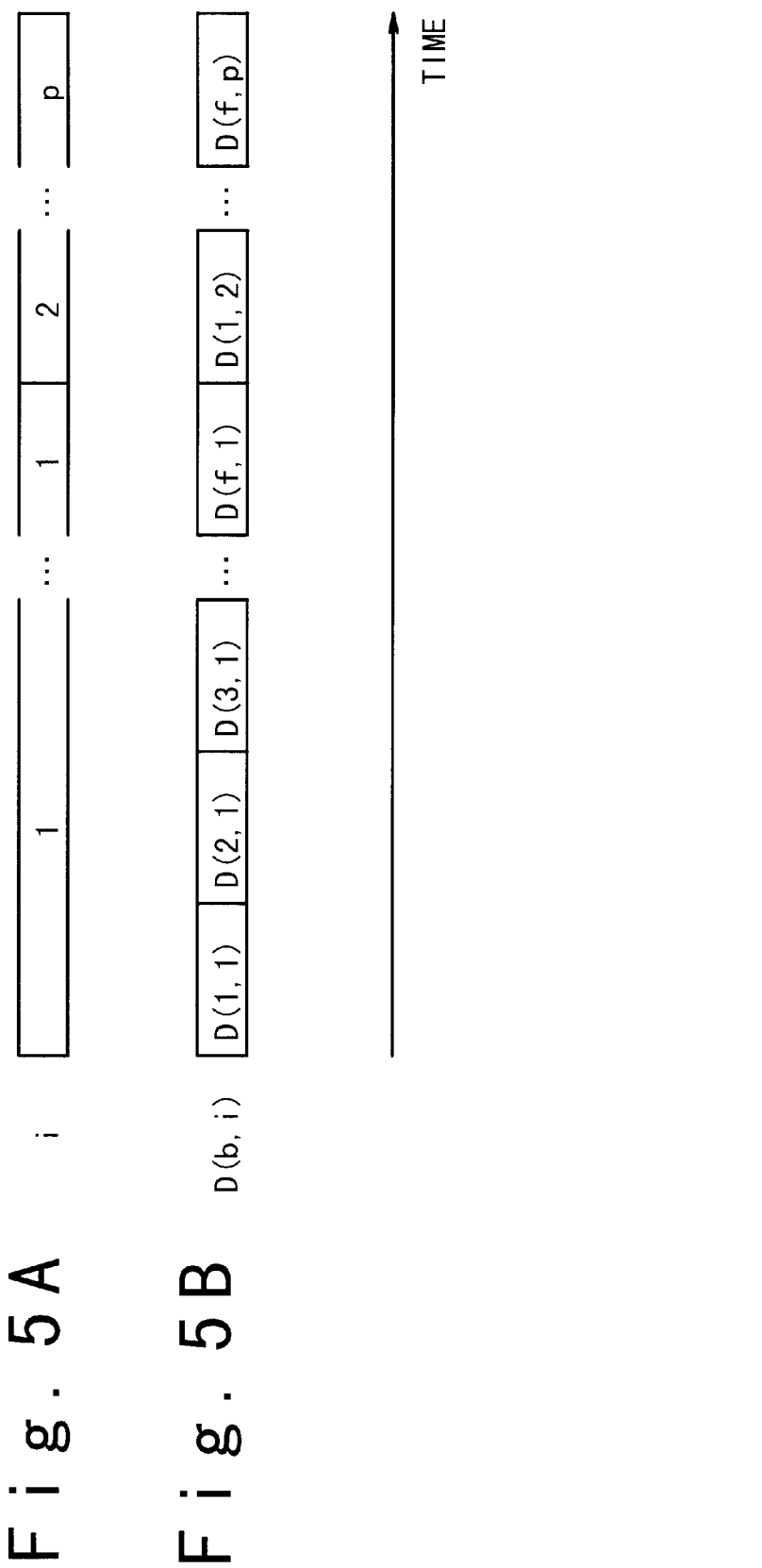
FIGS. 5A and 5B are timing charts of input data to be summed in the summing circuit according to the first embodiment of the present invention.

Referring to FIG. 4 and FIGS. 5A and 5B, an example will be described, where (f×p) k-bit positive data D are inputted in order shown in the timing charts, and a summation value $$\Sigma D(b,i) = D(b,1) + D(b,2) + D(b,3) + \ldots + D(b,p)$$

is obtained by adding the p ($1 \leq i \leq p$) data D with respect to b ($1 \leq b \leq f$).

As show in FIG. 4, the input data is taken in the first flip-flop circuit 215 and bit-shifted by an exponential data held by the fifth flip-flop circuit 235 into the LSB direction by the first shifter 219. Thus, the first shift output data 241 is obtained. Also, the previous summation resultant data 207 is read out from the RAM 225 and taken in the second flip-flop circuit 217. Then, the previous summation resultant data 207 is bit-shifted by the value held by the fourth flip-flop circuit 231 into the LSB direction by the second shifter 221. Thus, the second shift output data 243 is obtained.

The first adder 223 adds the first shift output data 241 and the second shift output data 243 to newly produce the current summation resultant data 207. The current summation resultant data 207 is stored in the RAM 225. The bit-shifting operations by the first shifter 219 and the second shifter 221 prevent an overflow and functions to adjust the digits.

In order to check whether or not the increment of the exponential data is necessary, the logical OR calculating circuit 227 and the third flip-flop circuit 229 check the MSB of the current summation resultant data 207 while i is constant. When the MSB becomes 1 once or more, the value of the third flip-flop circuit 229 is set to 1. When the value of i is incremented, the fourth flip-flop circuit 231 takes in the third output data 247 from the third flip-flop circuit 229. The third output data 247 is added to the value held by the fifth flip-flop circuit 235. The values held by the fifth flip-flop circuit 235 and the fourth flip-flop circuit 231 are used for the bit-shifting operations by the first shifter 219 and the second shifter 221, respectively.

It should be noted that in the bit-shifting operations by the first shifter 219 and the second shifter 221, underflown bits are cut off and a value of 0 is placed in an upper bit in which any value does not exist. Also, the exponential data held by the fifth flip-flop circuit 235 is single regardless of the value of f. Therefore, the circuit scale of the summing circuit never changes even if the value of f increases.

Next, the operation of the summing circuit according to the first embodiment of the present invention will be described. Referring to the timing charts shown in FIGS. 6A to 6J, the process of the calculating operation of $$S(b,i1)=D(b,1)+D(b,2)+ \ldots +D(b,i1)$$

will be described.

First, an initial value of the exponential data is set, considering that a data is bit-shifted by the exponential data held by the fifth flip-flop circuit 235 into the LSB direction. In case of k<m, the initial value of the exponential data is 0 and the output of the first shifter 219 is k bits (k≦m−1). In case of k-≧m, the initial value of the exponential data is k−m+1 and the output of the first shifter 219 is (m−1) bits at maximum. Therefore, the output of the first shifter 219 is (m−1) bits at maximum regardless of the value of k.

Figure 6:
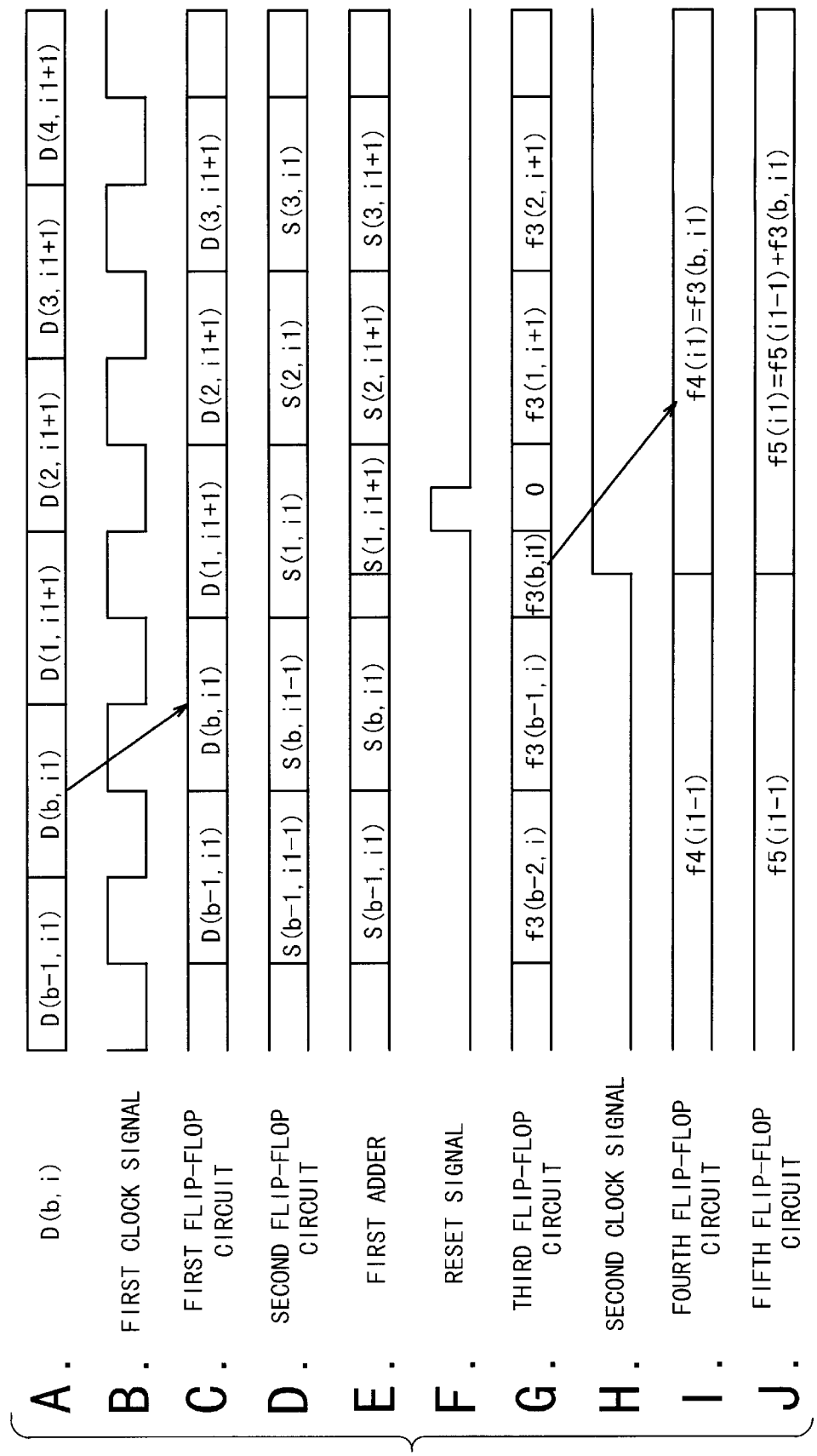
FIGS. 6A to 6J are timing charts to explain the operation of the summing circuit according to the first embodiment of the present invention when i is incremented.

When the input data 205 is D(b,i1), the data D(b,i1) is taken in the first flip-flop circuit 215 in response to the rising edge of the first clock signal 261, as shown in FIG. 6B. Then, the data D(b,i1) is bit-shifted into the LSB direction by the first shifter 219 by the exponential data f5(i1-1) held by the fifth flip-flop circuit 235, as shown in FIG. 6J. Thus, the first output data 237 is obtained.

Also, a summation resultant data S(b,i1-1) having the same subscript b and indicating a summation result from 1 to i1−1 with respect to i is taken in the second flip-flop circuit 217 from the RAM 225 in response to the rising edge of the first clock signal 261, as shown in FIG. 6D. Then, the summation resultant data S(b,i1-1) is bit-shifted by the value f4(i1-1) held by the fourth flip-flop circuit 231 into the LSB direction by the second shifter 221, as shown in FIG. 6I.

It should be noted that when i becomes equal to 1, the values of the second flip-flop circuit 217 and the fourth flip-flop circuit 231 are set to 0, and the bit-shifting result of the summation resultant data into the LSB direction is also set to 0. The outputs of the first shifter 219 and the second shifter 221 are added by the first adder 223. The adding result S(b,i1) is written in the RAM 225 as a new summation resultant data, as shown in FIG. 6E.

The initial value of the third flip-flop circuit 229 is set to 0 and is reset 0 in response to a reset signal 265 every time the value of i changes, as shown in FIG. 6F. The logical OR of the value held by the third flip-flop circuit 229 and the MSB of the adding result by the first adder 223 is calculated by the logical OR calculating circuit 227 during a period from when i is set to i1 to when i is set to i1+1. When the MSB becomes 1 once or more through this processing, the third flip-flop circuit 229 is set to 1.

The output of the third flip-flop circuit 229 is taken in by the fourth flip-flop circuit 231 in response to the rising edge of the second clock signal 263, as shown in FIGS. 6H and 6I. When the MSB becomes 1 once or more during a period of i=i1 to i1+1, the fourth flip-flop circuit 231 is set to 1. If all the MSBs is 0, the fourth flip-flop circuit 231 is set to 0. The value f4(i1) of the fourth flip-flop circuit 231 is set to the second shifter 221 as the shift amount at the time of i=i1+1.

The fifth flip-flop circuit 235 takes in the addition value of the value held therein and the output of the third flip-flop circuit 229 in response to the rising edge of the second clock signal 263, as shown in FIG. 6H and 6J. The value f5(i1) of the fifth flip-flop circuit 235 is the exponential data to the summation resultant data S(b,i1), and indicates a shift amount in the first shifter 219 when i changes from i1 to i1+1.

Moreover, referring to FIGS. 6A to 6J, the processing at the time of i=i1+1 will be described.

When the value f4(i1) is 0, the shift amount of the second shifter 221 is 0 and the bit-shift operation is not carried out. In this case, f5(i1)=f5(i1-1). Since the shift amount in the first shifter 219 at the time of i=i1+1 does not change from the shift amount at the time of i=i1, the exponential data of the outputs of the first shifter 219 and the second shifter 221 are coincident with each other. Also, since the MSB of the summation resultant data read out from the RAM 225 is 0, the output of the second shifter 221 may be (m−1) bits.

When f4(i1) is 1, the shift amount of the second shifter 221 is set to 1. In this case, f5(i1)=f5(i1-1)+1. The shift amount in the first shifter 219 at the time of i=i1+1 increases by 1 from the shift amount at the time of i=i1. Therefore, the exponential data of the outputs of the first shifter 219 and the second shifter 221 are coincident with each other. Also, the output of the second shifter 221 which has been bit-shifted by 1 bit into the LSB direction may be (m−1) bits.

As seen from the above, the output of the second shifter 221 becomes (m−1) bits. As described above, since the output of the first shifter 219 is also (m-1) bits, the output of the first adder 223 is m bits and never overflows.

When f4(i1) is 0, the adding result of the first adder 223 does not overflow even if the shift amount is not incremented at the time of i=i1+1. Therefore, the summation resultant data as the adding result can be stored in the RAM 225 without increasing the shift amount. The summation resultant data with the good precision can be stored in the RAM 225 because the shift amount is not increased. When f4(i1) is 1, there is possibility that the output of the first adder 223 overflows unless the shift amount is not incremented at the time of i=i1+1. Therefore, the bit shifting operation is carried out.

Through the above operation, the exponential data of the input data and the summation resultant data are adjusted. Thus, the summation can be carried out to decrease a part of the data to be cut off, while an overflow is prevented. It should be noted that the summation resultant data stored in the RAM is shifted into the right direction by the exponential data. However, the data are bit-shifted into the left direction by the exponential data held by the flip-flop circuit, if necessary.

Figure 7:
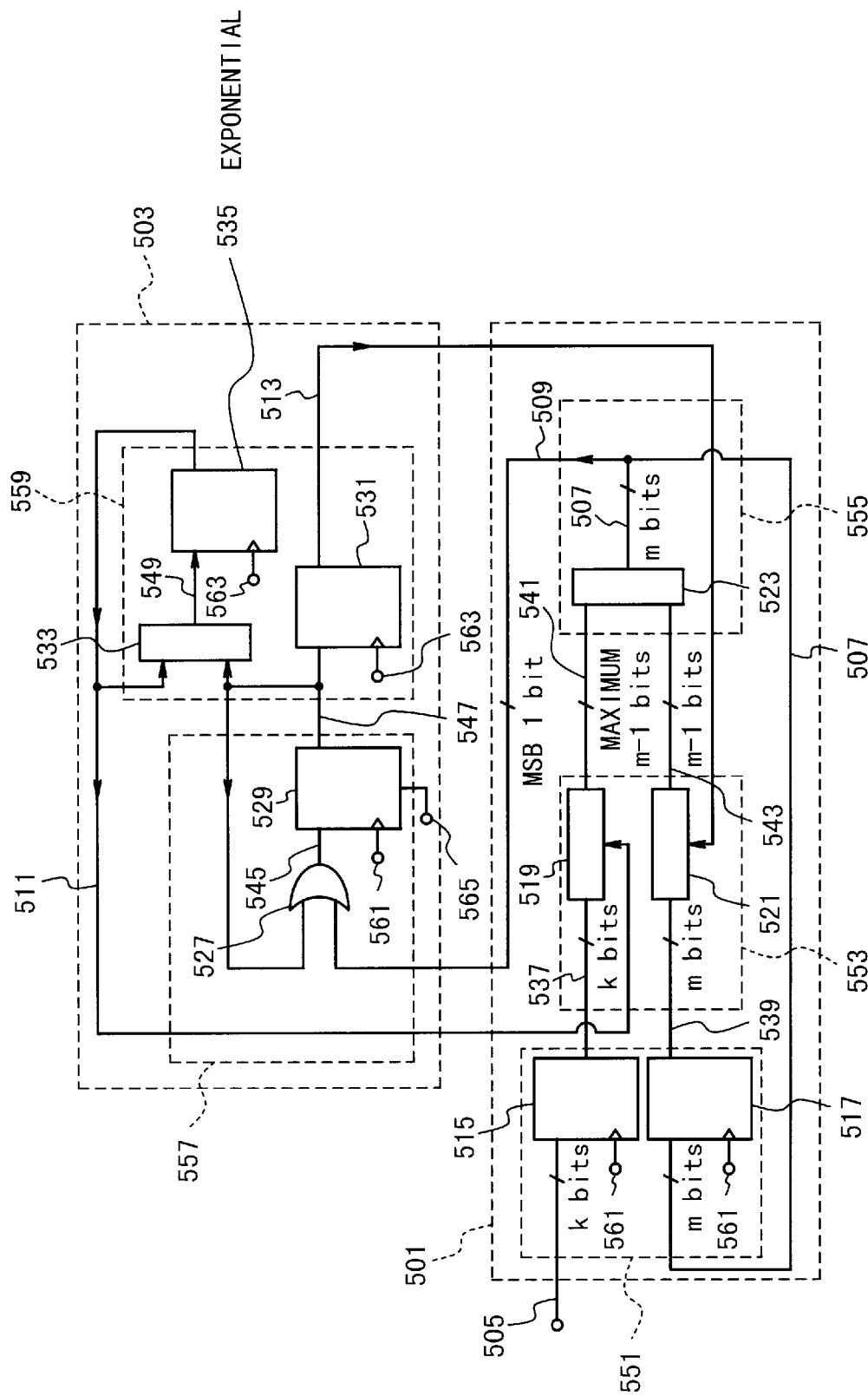
FIG. 7 is a block diagram illustrating the structure of the summing circuit according to a second embodiment of the present invention.

Next, the summing circuit according to the second embodiment of the present invention will be described. The structure of the summing circuit is shown in FIG. 7. The summing circuit in the second embodiment is almost the same as the summing circuit in the first embodiment. Therefore, only the difference point will be described.

Referring to FIG. 7, in the second embodiment, the RAM is not used for the storage of the summation resultant data. The current summation resultant data 507 is held in the second flip-flop circuit 517. Also, a case of f=1 is taken as an example in this embodiment. However, if a plurality of flip-flop circuits are provided and switched to hold the summation resultant data at any time, this embodiment is possible to apply to the case of f>1. The advantage of the second embodiment is in that it is unnecessary to provide any RAM outside of the LSI for the summing circuit. Thus, the number of LSIs to be used can be reduced. Because it is necessary to increase the flip-flop circuits to hold the summation resultant data when f becomes large, this embodiment is useful when f is relatively small.

Moreover, the summing circuit according to the third embodiment of the present invention will be described. The structure of the summing circuit in the third embodiment is shown in FIG. 8. The structure of the summing circuit in the third embodiment is similar to that of the summing circuit in the first embodiment. Therefore, only the difference point will be described.

Referring to FIG. 8, a logical AND operation circuit 628 is provided in front of the logical OR operation circuit 627, in addition to the structure of the first embodiment showed in FIG. 4. The logic AND operation circuit 628 calculates a logical AND of (m−k) bits of the summation resultant data in a bit unit.

This structure is possible to apply in case of k<m, and a part of the data to be cut off can be reduced more than that in the first embodiment. It should be noted that in case of k=m−1, the third embodiment is equivalent to the first embodiment. In the third embodiment, the condition that an overflow will occur in the next addition is defined narrower by referring to the upper (m−k) bits from the MSB of the current summation resultant data 607.

As described above, according to the summing circuit of the present invention, the bits to be cut off when there is less possibility to cause an overflow is reduced so that the RAM is effectively used. Thus, degradation in the precision of the summation can be avoided.

Also, the summing circuit of the present invention does not depend on the number of input data to be summed and its circuit scale is invariable.

As the example, consider a case where 1000 8-bit input data (k=8, p=1000) are summed to obtain 16-bit summation data (m=16) such that it is stored in the RAM. In this case, in the first conventional example of the summing circuit, an overflow can not be prevented unless lower 2 bits are cut off from all the input data to produce 6-bit data.

However, in the summing circuit of the present invention, the cutting-off operation is not carried out until the MSB of the summation resultant data is set to 1. Even when the necessity of the cutting-off operation occurs the earliest, i.e., even when the input data in the specific b shown in FIG. 5B always takes a maximum value, the cutting-off operation is not necessary to be carried out in the summation of the first 129 data (i≦129). Unless the input data in the specific b does not always take the maximum value a value near to the maximum value, the necessity of the cutting-off operation will not occur for later input data. Thus, the degradation in the precision of the summation can be reduced.

Especially, when the summing circuit in the third embodiment is used, the earliest necessity of the cutting-off operation will occur for 258-th input data. In this way, the third embodiment is effective especially when m−k is large.

What is claimed is:

1. A summing circuit comprising:
   a summing section which receives an input data and a previous summation resultant data, bit-shifts said input data and said previous summation resultant data in response to first and second bit shift control signals, respectively, and adds said bit-shifted input data and said bit-shifted previous summation resultant data to generate a current summation resultant data and to output a part of said current summation resultant data as a shift bit calculation data; and
   a shift bit searching section which outputs said first and second bit shift control signals for addition of a next input data and said current summation resultant data to said summing section based on said shift bit calculation data.

2. A summing circuit according to claim 1, wherein said summing section includes:
   a data holding section which holds said input data and said previous summation resultant data to output as first and second output data, respectively;
   a data shifter which shifts said first output data into a LSB (Least Significant Bit) direction in response to said first bit shift control signal to output a first shift data, and shifts said second output data into the LSB direction in response to said second bit shift control signal to output a second shift data; and
   a data adder which adds said first and second shift data to output said current summation resultant data and said shift bit calculation data.

3. A summing circuit according to claim 2, wherein said data adder includes:
   a first adder which adds said first and second shift data to output said current summation resultant data; and
   a memory unit which stores said current summation resultant data.

4. A summing circuit according to claim 2, wherein said data adder includes:
   a first adder which adds said first and second shift data to output said current summation resultant data.

5. A summing circuit according to claim 2, wherein said data shifter includes:
   a first shifter which bit-shifts said first output data based on said first bit shift control signal to output said first shift data; and
   a second shifter which bit-shifts said second output data based on said second bit shift control signal to output said second shift data.

6. A summing circuit according to claim 2, wherein said data holding section includes:
   a flip-flop circuit which holds said input data to output said first output data; and
   a flip-flop circuit which holds said previous summation resultant data to output said second output data.

7. A summing circuit according to claim 1, wherein said shift bit searching section includes:
   a data searching section which outputs a third output data in response to a change of said shift bit calculation data; and
   a control data generating section which generates said first and second bit shift control signals based on said third output data.

8. A summing circuit according to claim 7, herein said data searching section includes:
   a logical OR calculating circuit; and
   a flip-flop circuit which holds a logical OR output data outputted from said logical OR calculating circuit to output a third output data, and
   wherein said logical OR calculating circuit receives said shift bit calculation data and said third output data to output said logical OR output data.

9. A summing circuit according to claim 7, wherein said data searching section includes:
   a logical AND calculating circuit which calculates a logical AND of bits of said shift bit calculation data;
   a logical OR calculating circuit;
   a flip-flop circuit which holds a logical OR output data outputted from said logical OR calculating circuit to output a third output data, and
   wherein said logical OR calculating circuit receives said shift bit calculation data and said third output data to output said logical OR output data.

10. A summing circuit according to claim 7, herein said control data generating section includes:
    a flip-flop circuit which outputs said second bit shift control signal based on said third output data;

a second adder which adds said third output data and said first bit shift control signal to output a shift bit data; and a fifth flip-flop which generates said first bit shift control signal based on said shift bit data outputted from said second adder, said first bit shift control signal being outputted to said second adder.

11. A method of summing a plurality of input data, comprising:

bit-shifting an input data and a previous summation resultant data in response to first and second bit shift control signals, respectively;

adds said bit-shifted input data and said bit-shifted previous summation resultant data to generate a current summation resultant data, a part of said current summation resultant data being a shift bit calculation data; and estimating said first and second bit shift control signals for addition of a next input data and said current summation resultant data based on said shift bit calculation data.

* * * * *